US011881621B1

(12) United States Patent
Koutinos et al.

(10) Patent No.: US 11,881,621 B1
(45) Date of Patent: Jan. 23, 2024

(54) ANTENNAS WITH INCREASED BANDWIDTH

(71) Applicants: Anastasios Koutinos, Miami, FL (US); Constantinos Zekios, Miami, FL (US); Stavros Georgakopoulos, Miami, FL (US)

(72) Inventors: Anastasios Koutinos, Miami, FL (US); Constantinos Zekios, Miami, FL (US); Stavros Georgakopoulos, Miami, FL (US)

(73) Assignee: THE FLORIDA INTERNATIONAL UNIVERSITY BOARD OF TRUSTEES, Miami, FL (US)

(*) Notice: Subject to any disclaimer, the term of this patent is extended or adjusted under 35 U.S.C. 154(b) by 0 days.

(21) Appl. No.: 18/328,390

(22) Filed: Jun. 2, 2023

(51) Int. Cl.
*H01Q 13/02* (2006.01)
*H01Q 13/10* (2006.01)

(52) U.S. Cl.
CPC ......... *H01Q 13/0283* (2013.01); *H01Q 13/02* (2013.01); *H01Q 13/10* (2013.01)

(58) Field of Classification Search
CPC ..... H01Q 13/0283; H01Q 13/10; H01Q 13/02
USPC .......................................................... 343/767
See application file for complete search history.

(56) References Cited

U.S. PATENT DOCUMENTS

| | | | | |
|---|---|---|---|---|
| 5,216,430 A * | 6/1993 | Rahm | H01Q 21/065 | 343/846 |
| 6,538,528 B2 * | 3/2003 | Louzir | H01P 1/184 | 333/136 |
| 6,674,410 B1 * | 1/2004 | Davidovitz | H01P 5/16 | 342/373 |
| 8,044,874 B2 * | 10/2011 | Parsche | H01Q 9/0435 | 343/770 |
| 2018/0219283 A1 * | 8/2018 | Wilkins | H01Q 1/523 | |

OTHER PUBLICATIONS

A. G. Koutinos et al., A Novel Quadruple-Fed Rectangular Patch Antenna with Improved Bandwidth Performance, 2015 Loughborough Antennas & Propagation Conference (LAPC), 2015, pp. 1-5, 5 pages.
A. G. Koutinos et al., A Two-Element Patch Antenna exploiting Path Inequality for Bandwidth Augmentation, 9th European Conference on Antennas and Propagation, Portugal, 2015, pp. 1-5, 5 pages.
A. G. Koutinos et al., A Wideband Matching Technique for Polarization Versatile Applications, Progress in Electromagnetics Research Symposium Proceedings, Czech Republic, 2015, pp. 2081-2085, 5 pages.
A. G. Koutinos et al., Bandwidth enhancement of a supershape patch antenna using multiple feeding technique, 2017 International Workshop on Antenna Technology: Small Antennas, Innovative Structures and Applications (iWAT), Athens, Greece, pp. 211-214, 4 pages.

* cited by examiner

*Primary Examiner* — Hai V Tran
(74) *Attorney, Agent, or Firm* — Saliwanchik, Lloyd & Eisenschenk

(57) ABSTRACT

Antennas with increased bandwidth are provided. The bandwidth of an antenna can be increased by feeding it at a single point through N sides with a 1:N power divider, where N is an integer greater than 1. This bandwidth enhancement approach can be applied to different types of antennas, and with this design approach the bandwidth of an antenna can be increased without increasing its footprint.

19 Claims, 12 Drawing Sheets

Both Sided fed triangular slot antenna

Single Side fed triangular slot antenna

Both Sided fed triangular slot antenna

Single Side fed triangular slot antenna

ANTENNAS WITH INCREASED BANDWIDTH

GOVERNMENT SUPPORT

This invention was made with government support under FA9550-19-1-0290 awarded by the Air Force Office of Scientific Research. The government has certain rights in the invention.

BACKGROUND

The feeding port of an antenna can be placed at different sides for the same feeding point and can potentially excite the same mode of operation with different (or the same) impedance. Typically, when symmetric feeding points are used, they excite the same mode of operation.

BRIEF SUMMARY

Embodiments of the subject invention provide novel and advantageous antennas with increased bandwidth, as well as methods of fabricating and using the same. The bandwidth of an antenna can be increased by feeding it at a single point through N sides with a divider (e.g., a 1:N divider, such as a 1:N power divider), where N is an integer greater than 1. This bandwidth enhancement approach can be applied to different types of antennas, and with this design approach the bandwidth of an antenna can be increased without increasing its footprint.

In an embodiment, an antenna can comprise: an antenna ground plane comprising an antenna element, the antenna element being fed at a first feeding point from N different sides, where N is an integer greater than 1 (e.g., 2, 3, or 4); and an unequal 1:N power divider connected to the antenna ground plane as a feeding network to excite the feeding point. The antenna can have a bandwidth that is larger (at least 75% larger, at least 80% larger, or at least 85% larger) than a bandwidth of a single-side-fed antenna with a same footprint as the antenna. The antenna can further comprise: a power divider bottom part of the power divider; a bottom substrate disposed on the power divider bottom part, the antenna ground plane being disposed on the bottom substrate; a top substrate disposed on the antenna ground plane; and a power divider top part of the power divider disposed on the top substrate. The bottom substrate can be in direct physical contact with the power divider bottom part; the antenna ground plane can be in direct physical contact with the bottom substrate; the top substrate can be in direct physical contact with the antenna ground plane, and/or the power divider top part can be in direct physical contact with the top substrate. The antenna can further comprise a power divider via connecting the power divider bottom part to the power divider top part at a first location and going through the bottom substrate, the antenna ground plane, and the top substrate, the first location being spaced apart from the first feeding point. The antenna can further comprise: a first feed via disposed at the first feeding point and connecting the power divider bottom part to the antenna ground plane; and a second feed via disposed above the first feed via and connecting the antenna ground plane to the power divider top part. The N different sides can be connected to each other by a coupled connection. A thickness of the bottom substrate can be equal to a thickness of the top substrate, though embodiments are not limited thereto. The antenna element can be, for example, a patch antenna element, a slot antenna element, or a printed dipole antenna element, though embodiments are not limited thereto. Each side of the N sides can excite a same mode of operation of the antenna. Each side of the N sides can excite a mode of operation at its own respective impedance (which can be the same or different from that of other side(s) of the N sides). The antenna can be configured to exhibit consistent radiation performance across an entire operational bandwidth of the antenna. The power divider can be, for example, a multilayer power divider.

DETAILED DESCRIPTION

Embodiments of the subject invention provide novel and advantageous antennas with increased bandwidth, as well as methods of fabricating and using the same. The bandwidth of an antenna can be increased by feeding it at a single point through N sides with a divider (e.g., a 1:N power divider), where N is an integer greater than 1. This bandwidth enhancement approach can be applied to different types of antennas, and with this design approach the bandwidth of an antenna can be increased without increasing its footprint.

In related art antennas, when symmetric feeding points are used, they excite the same mode of operation. In embodiments of the subject invention, though, the same feeding point can be used but from different sides to excite the same mode of operation. Each mode of operation can have a different impedance. In order to increase the bandwidth of a single point fed antenna, it can simultaneously be fed at the same point but from different sides using an unequal-power divider. The resulting bandwidth of the multi-side fed antenna is equal to the sum of the bandwidths of the single point fed antenna for each one of the multiple feeding points. Excitations at the same point can be done through physical connections (see, e.g., FIGS. 2-4) or through coupled connections (see, e.g., FIGS. 7-9).

Embodiments of the subject invention are based on a design approach that increases the bandwidth of an antenna by feeding it at a single point through N sides with a 1:N divider (e.g., 1:N power divider), where N is an integer. This bandwidth enhancement approach can be applied to different antennas. This design approach increases the bandwidth of an antenna while keeping its footprint (i.e., surface area) the same.

Figure 1:
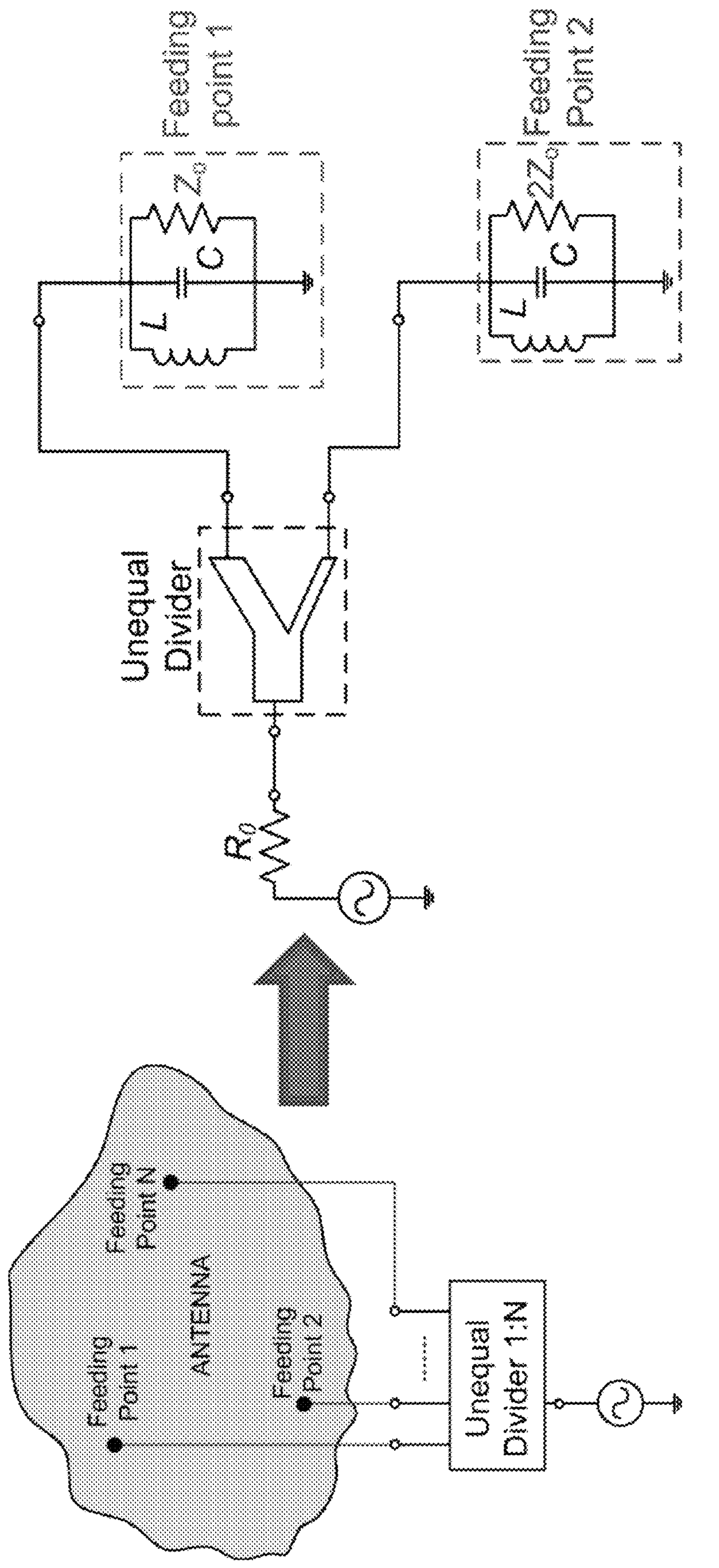
FIG. 1 shows a schematic view of an antenna, according to an embodiment of the subject invention.

FIG. 1 shows a schematic view of an antenna, according to an embodiment of the subject invention. Referring to FIG. 1, the antenna can include an antenna-ground plane fed by different sides using the same feeding point. All the feeding point sides can excite the same mode of operation. This mode can have a different (or the same) characteristic impedance: $Z_1$ for the first point side, $Z_2$ for the second point side, . . . , $Z_N$ for the $N^{th}$ point side. That is, each feeding point side can have its own characteristic impedance, which can be the same or different from that of any or all other points. An unequal divider (e.g., 1:N (power) divider) can be used as the feeding network to excite the N ports (feeding point sides) of the antenna, thereby making the antenna with the divider a single-port radiating element. N connections can be made between the N divider outputs and the N antenna feeding point sides (for example, any or all connections can be vias). FIG. 1 lists "feeding points", but this refers to ports (or total sides of all feeding points).

In many embodiments, an antenna can include a divider bottom part, a bottom substrate disposed on the divider bottom part, an antenna ground plane (e.g., a printed dipole ground plane, a triangular tapered slot antenna ground plane, etc.) disposed on the bottom substrate, a top substrate disposed on the antenna ground plane, and a divider top part disposed on the top substrate. Any of these elements can be in direct physical contact with the element on which it is disposed. The antenna ground plane can include an antenna element (e.g., a patch antenna, a dipole antenna, a slot antenna, etc.). A thickness ($h_1$) of the top substrate can be the same as or different from a thickness ($h_2$) of the bottom substrate (see, e.g., FIG. 8, in which $h_1=h_2=h$) The antenna can further comprise a divider via connecting the divider bottom part to the divider top part at a first location and going through the bottom substrate, the antenna ground plane, and the top substrate (see also, e.g., FIGS. 2-4 and 7-9). The antenna can further comprise a first feed via connecting the divider bottom part to the antenna ground plane at a feeding point different from the first location and/or a second feed via connecting the antenna ground plane to the divider top part at the feeding point (i.e., the second feed via can be disposed directly above the first feed via; see also, e.g., FIGS. 2-4). Instead of first and second feed vias, a single feed via can connect the divider bottom part to the divider top part. As an alternative to the feed via(s), feeding can be achieved by a coupled connection (see, e.g., FIGS. 7-9). If additional feeding points are included, additional feed vias and/or coupled connections can be included, and they can have the features as discussed herein.

Figure 2:
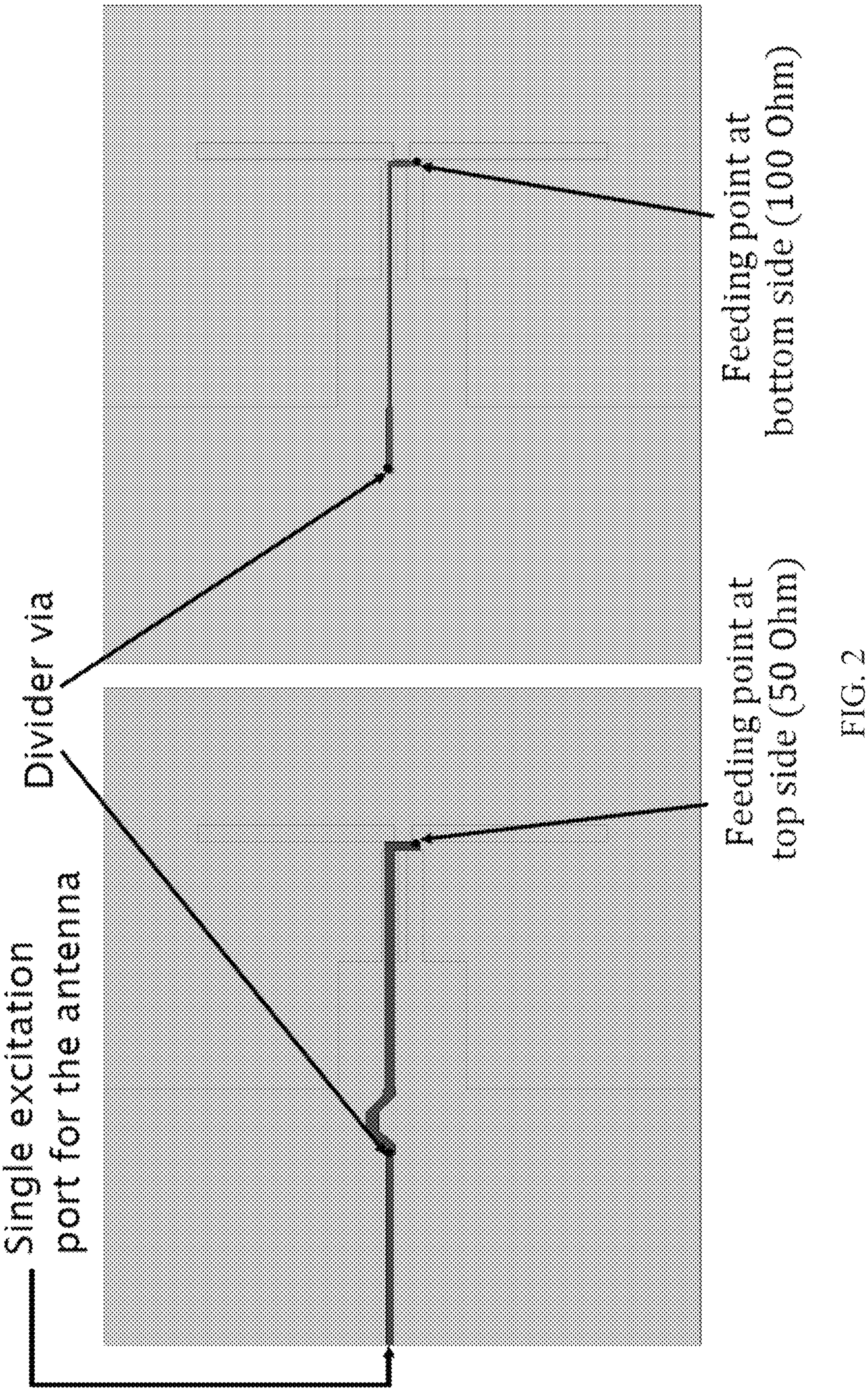
FIG. 2 shows a top view (left side of figure) and bottom view (right side of figure) of a bandwidth enhanced printed dipole antenna (BEPDA), according to an embodiment of the subject invention. Although certain values are listed in FIG. 2, these are for exemplary purposes only and should not be construed as limiting.
Figure 3:
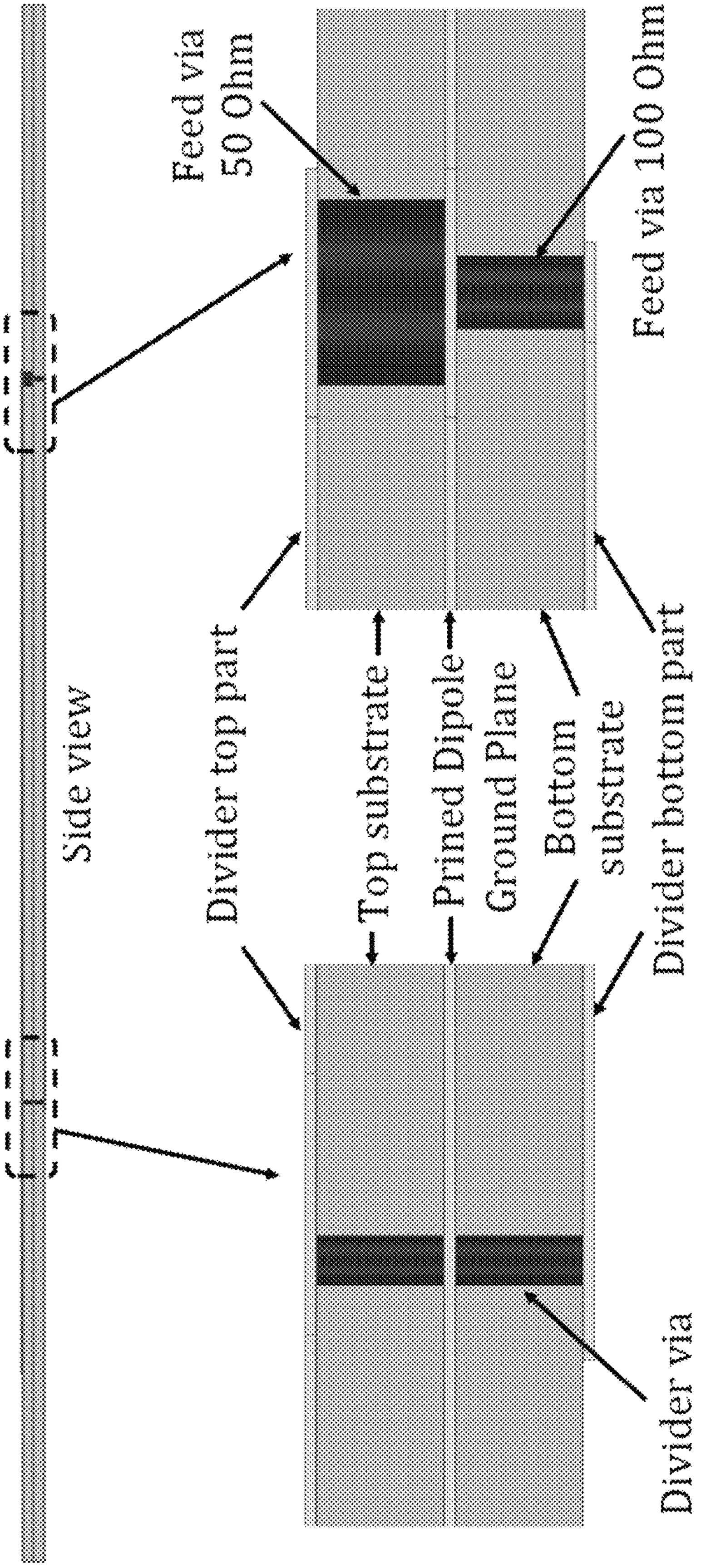
FIG. 3 shows a side view of the BEPDA from FIG. 2.
Figure 4:
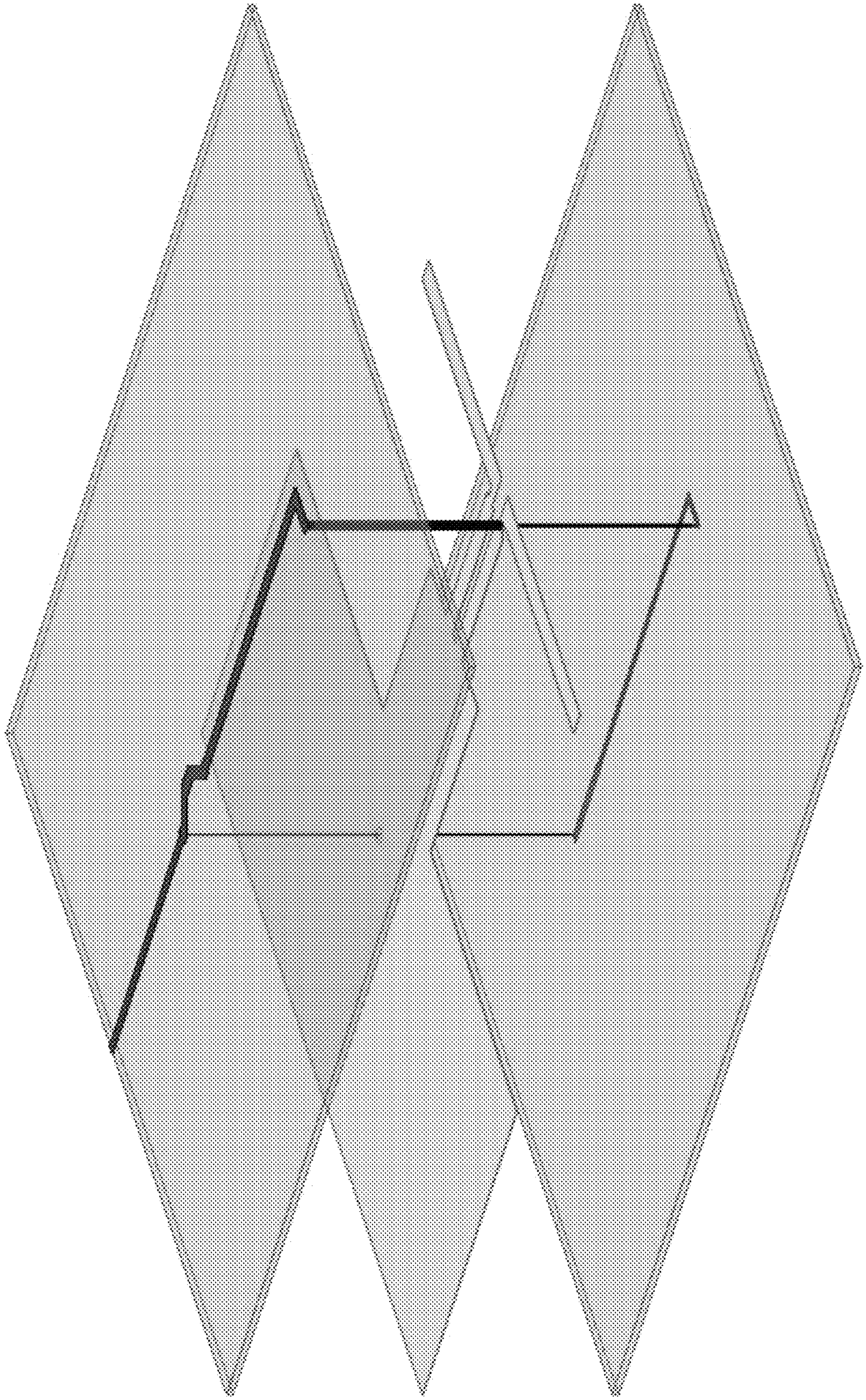
FIG. 4 shows an exploded view of the BEPDA from FIGS. 2 and 3.

FIG. 2 shows a top view (left side of figure) and bottom view (right side of figure) of a bandwidth enhanced printed dipole antenna (BEPDA), according to an embodiment of the subject invention. Although certain values are listed in FIG. 2, these are for exemplary purposes only and should not be construed as limiting. FIGS. 3 and 4 show a side view and an exploded view, respectively, of the BEPDA. Referring to FIGS. 2-4, the printed dipole antenna can be fed at a single point from two different sides (top of the substrate and bottom of the substrate). Each feed point can excite the same mode of operation, and the mode of operation excited by each side can have its own characteristic impedance (which may the same as or different from that of the other side). The antenna can be fed simultaneously at both sides using an unequal (1:2) divider. The divider can be, for example, a multilayer divider (though embodiments are not limited thereto), and its output ports can be connected to the feeding points for the two sides through, e.g., vias (though embodiments are not limited thereto). The BEPDA achieves increased bandwidth compared to a traditional single-fed dipole antenna (see also Example 1). In addition, the BEPDA can exhibit consistent radiation performance across the entire increased bandwidth (i.e., its radiation characteristics can remain the same across the entire increased bandwidth).

Figure 7:
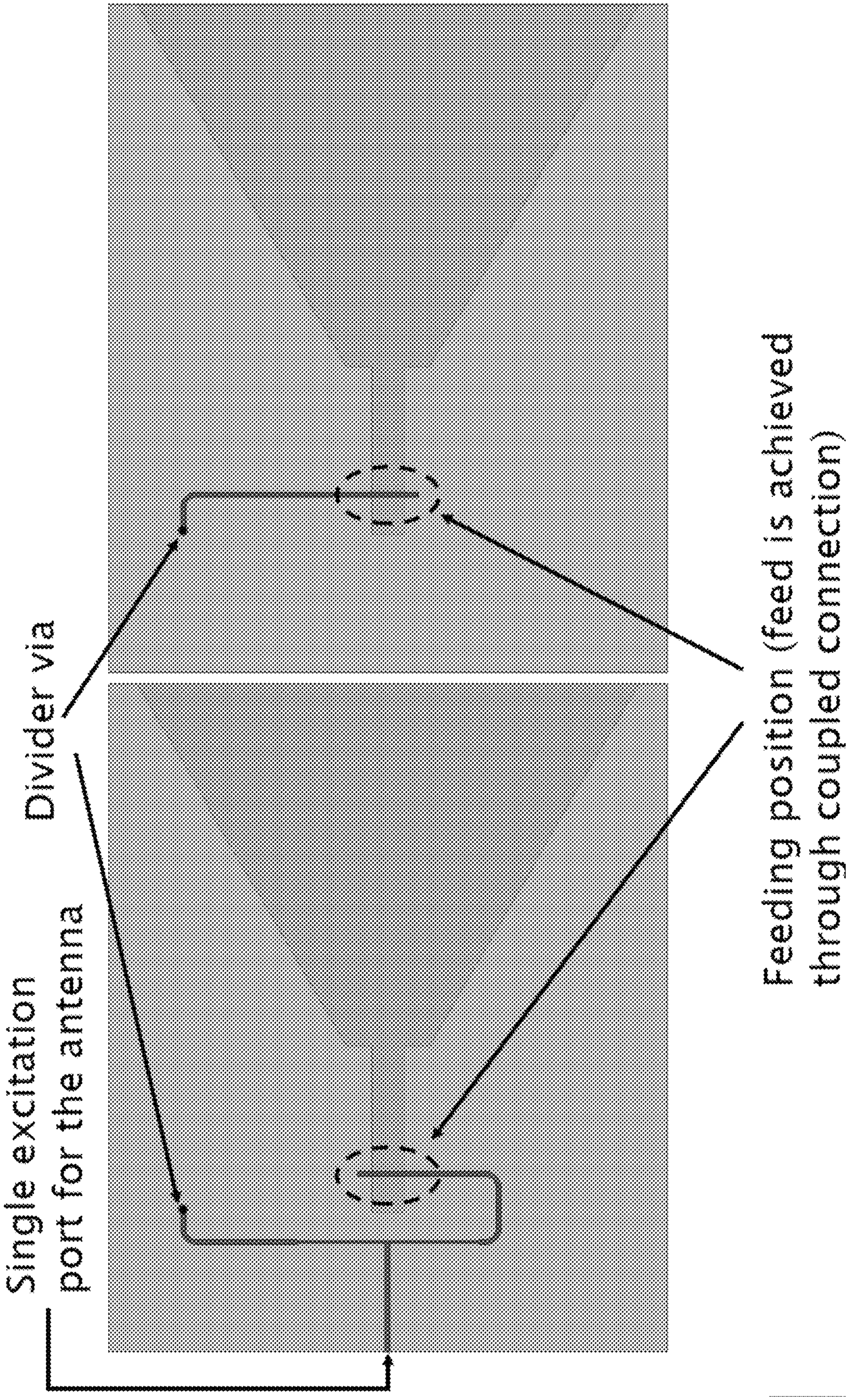
FIG. 7 shows a top view (left side of figure) and bottom view (right side of figure) of a bandwidth enhanced triangular tapered slot antenna (BETTSA), according to an embodiment of the subject invention. Although certain values are listed in FIG. 2, these are for exemplary purposes only and should not be construed as limiting.
Figure 8:
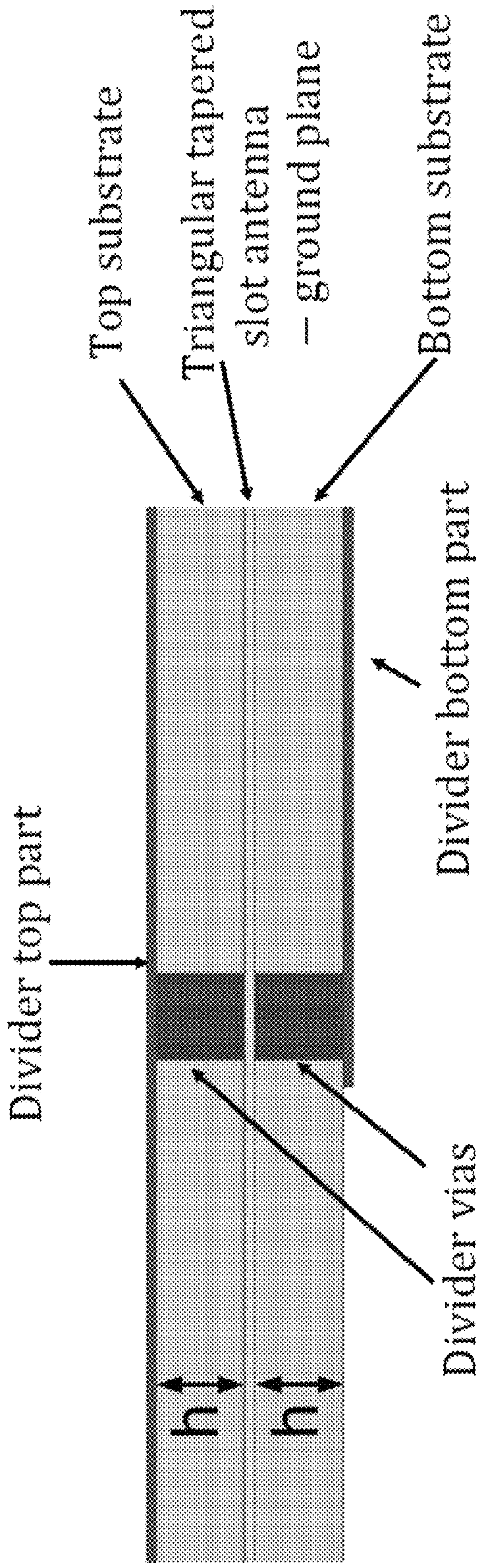
FIG. 8 shows a side view of the BETTSA from FIG. 7.
Figure 9:
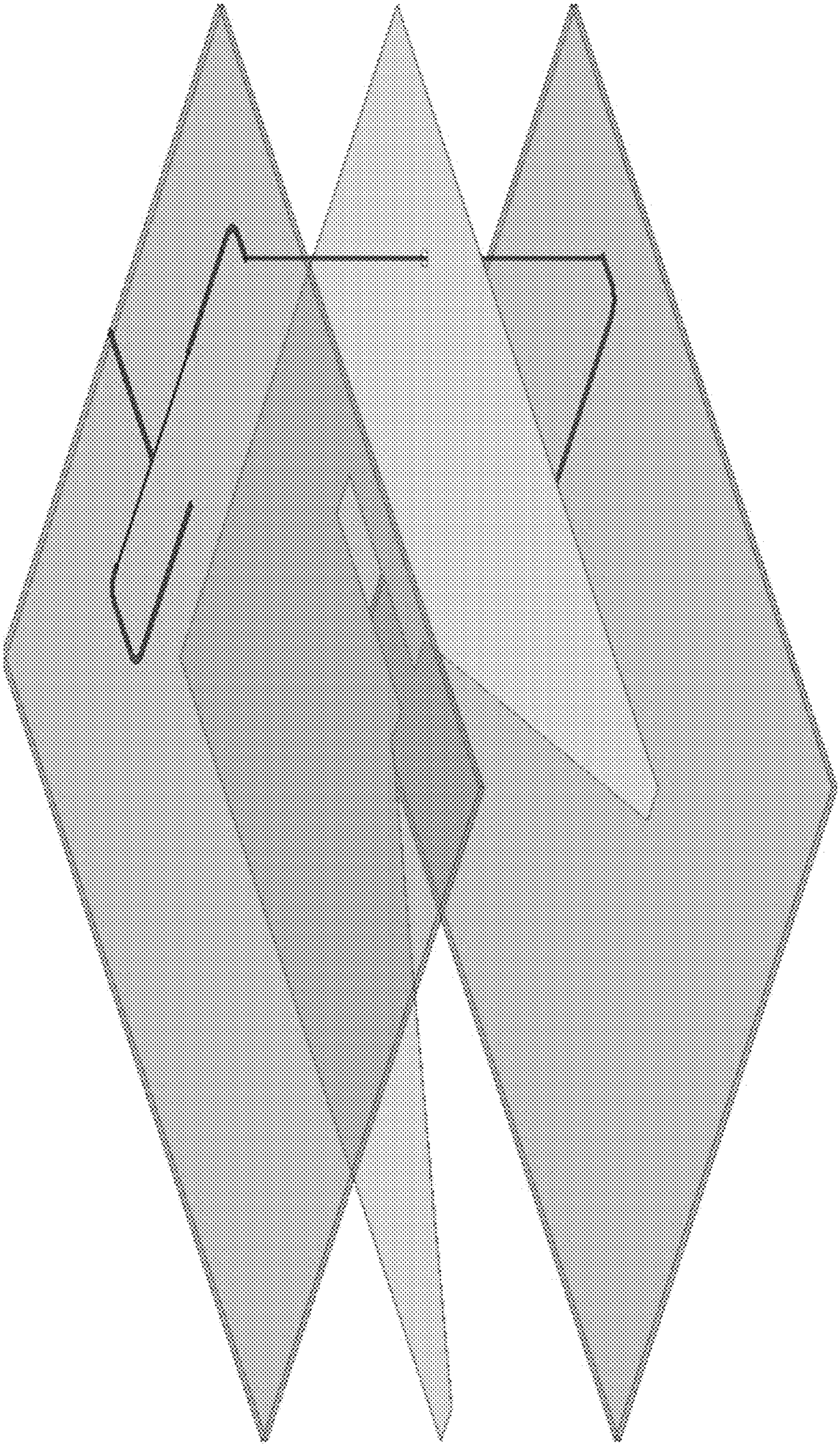
FIG. 9 shows an exploded view of the BETTSA from FIGS. 7 and 8.

FIG. 7 shows a top view (left side of figure) and bottom view (right side of figure) of a bandwidth triangular tapered slot antenna (BETTSA), according to an embodiment of the subject invention. FIGS. 8 and 9 show a side view and an exploded view, respectively, of the BETTSA. Referring to FIGS. 7-9, the patch antenna can be fed at a single point from two different sides (top of the substrate and bottom of the substrate). The mode of operation excited by each side can have the same characteristic impedance. The antenna can be fed simultaneously at the two sides using an unequal (1:2) divider. The divider can be, for example, a multilayer divider (though embodiments are not limited thereto), and its output ports can be connected to the coupled microstrip lines feeding the antenna. The BETTSA achieves increased bandwidth compared to a traditional single-fed triangular tapered slot antenna (see also Example 2). In addition, the BETTSA can exhibit consistent radiation performance across the entire increased bandwidth (i.e., its radiation characteristics can remain the same across the entire increased bandwidth).

Embodiments of the subject invention provide antennas with increased bandwidth. The bandwidth of an antenna can be increased by feeding it at a single point through N sides with a divider (e.g., a 1:N (power) divider), where N is an integer greater than 1 (e.g., 2, 3, 4). This bandwidth enhancement approach can be applied to different antennas, and with this design approach the bandwidth of an antenna can be increased while keeping its footprint (i.e., surface area) the same. Areas where embodiments of the subject invention can be advantageously used include but are not limited to 5G communications, 5G beyond communications, 6G communications, multi-functional communications, ultra-wideband communications, terrestrial communication systems, and satellite communication systems.

The following two references are hereby incorporated by reference herein in their entireties: Koutinos et al. (Bandwidth enhancement of antennas designed by band-pass filter synthesis due to frequency pulling techniques, IET Microw.

Antennas Propag., vol. 16(1), pp. 1-17, 2022, doi.org/10.1049/mia2.12206; and Koutinos et al. (A Reconfigurable Polarization—Frequency Supershape Patch Antenna with Enhanced Bandwidth, Electronics, vol. 9, no. 7, p. 1166, Jul. 2020, doi: 10.3390/electronics9071166).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

EXAMPLE 1

A BEPDA as shown in FIGS. 2-4 was designed and tested. The printed dipole antenna was fed at a single point from two different sides (top of the substrate and bottom of the substrate). Each feed point excited the same mode of operation, and the mode of operation excited by each side had a different characteristic impedance (50 Ohms (Ω) at the top side and 100 Ω at the bottom side). The antenna was fed simultaneously at both sides using an unequal 1:2 divider. The divider was a multilayer divider, and its output ports were connected to the feeding points for the two sides through vias. The BEPDA achieved increased bandwidth compared to a traditional single-fed dipole antenna.

Figure 5:
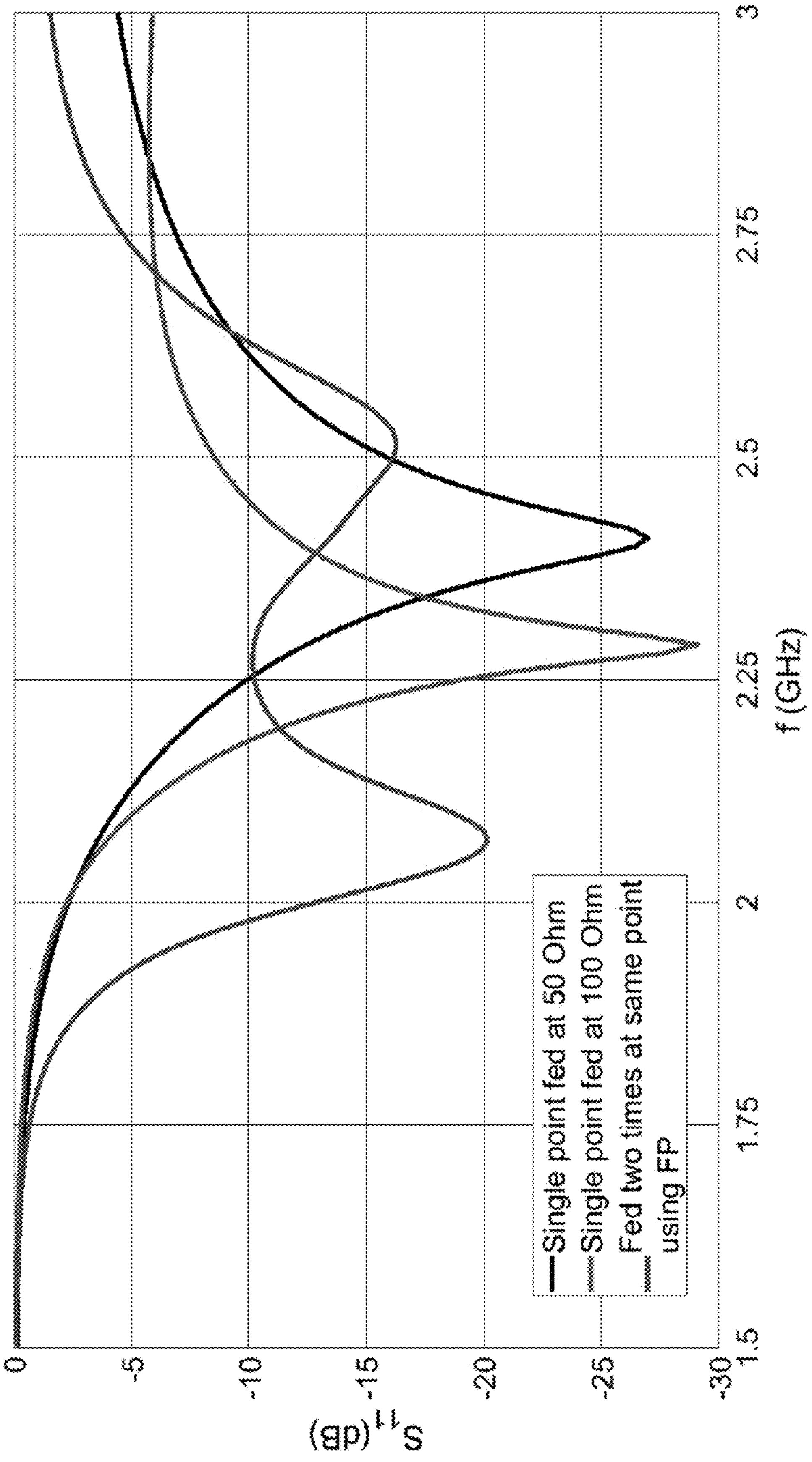
FIG. 5 shows a plot of $S_{11}$ (in decibels (dB)) versus frequency (in gigahertz (GHz)), showing the frequency bandwidth of a BEPDA. The curve with the highest $S_{11}$ value at a frequency of 3 GHz is for the case of fed two times at same point using the frequency pulling (FP) technique; the curve with the second-highest $S_{11}$ value at a frequency of 3 GHz is for the case of single point fed at 50 Ohms (Ω); and the curve with the lowest $S_{11}$ value at a frequency of 3 GHz is for the case of single point fed at 100 Ω.
Figure 6:
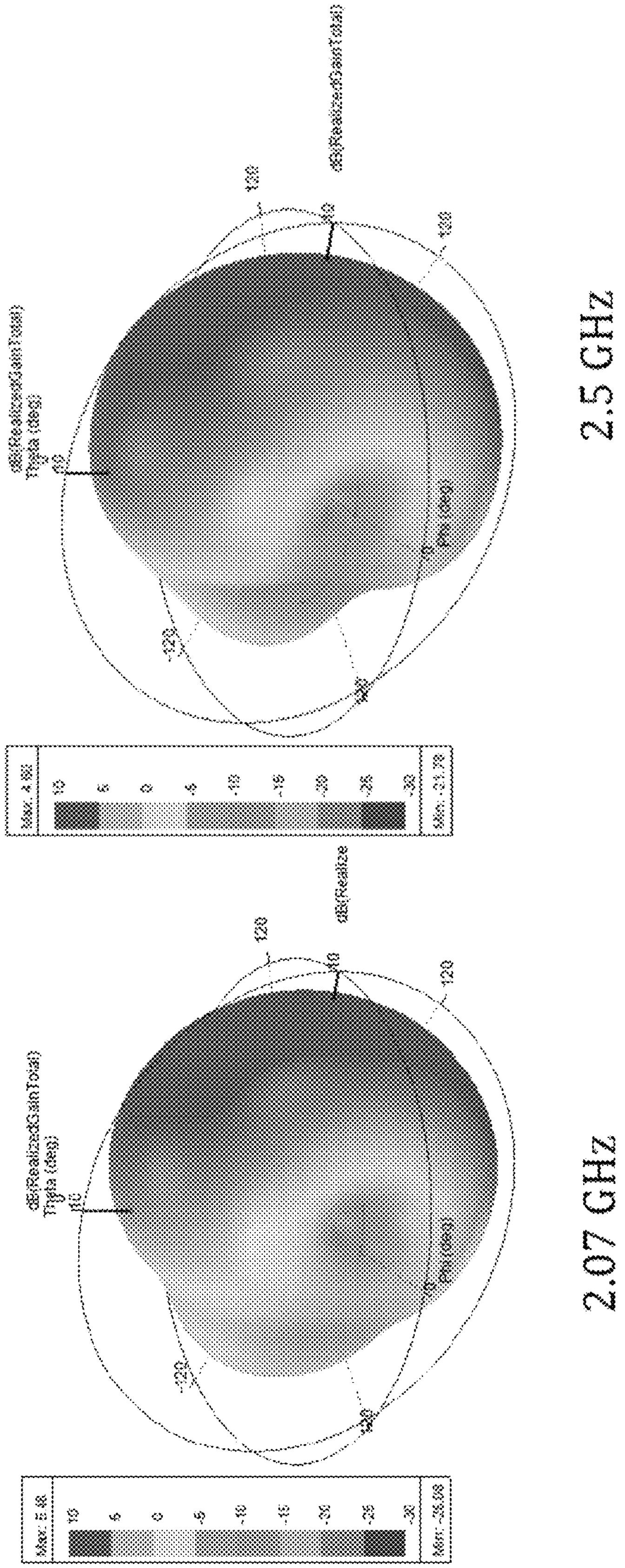
FIG. 6 shows radiation patterns for the BEPDA shown in FIGS. 2-4, at frequencies of 2.07 GHz and 2.5 GHz.

Referring to FIG. 5, the fractional bandwidth of the designed/tested BEPDA was 28.48% (for $S_{11}$<−10 decibels (dB), which is approximately equivalent to a voltage standing wave ratio (VSWR) of less than 2. The fractional bandwidth of the traditional dipole design is for the lower impedance and 11.68% for the higher impedance. Thus, the designed/tested BEPDA showed an 87% increase compared to the traditional design fed at lower impedance. Also, referring to FIG. 6, the designed tested BEPDA exhibited consistent radiation performance across the entire increased bandwidth (i.e., its radiation characteristics remained the same across the entire increased bandwidth). The radiation patterns of the BEPDA at two example frequencies as shown in FIG. 6 (here, the two best matched frequencies inside the antenna's bandwidth) confirm that the radiation characteristics were retained after the bandwidth enhancement.

EXAMPLE 2

A BEPDA as shown in FIGS. 7-9 was designed and tested. The patch antenna was fed at a single point from two different sides (top of the substrate and bottom of the substrate). The mode of operation excited by each side had the same characteristic impedance. The antenna was fed simultaneously at the two sides using an unequal 1:2 divider. The divider was a multilayer divider, and its output ports were connected to the coupled microstrip lines feeding the antenna. The BETTSA achieved increased bandwidth compared to a traditional single-fed triangular tapered slot antenna.

Figure 10:
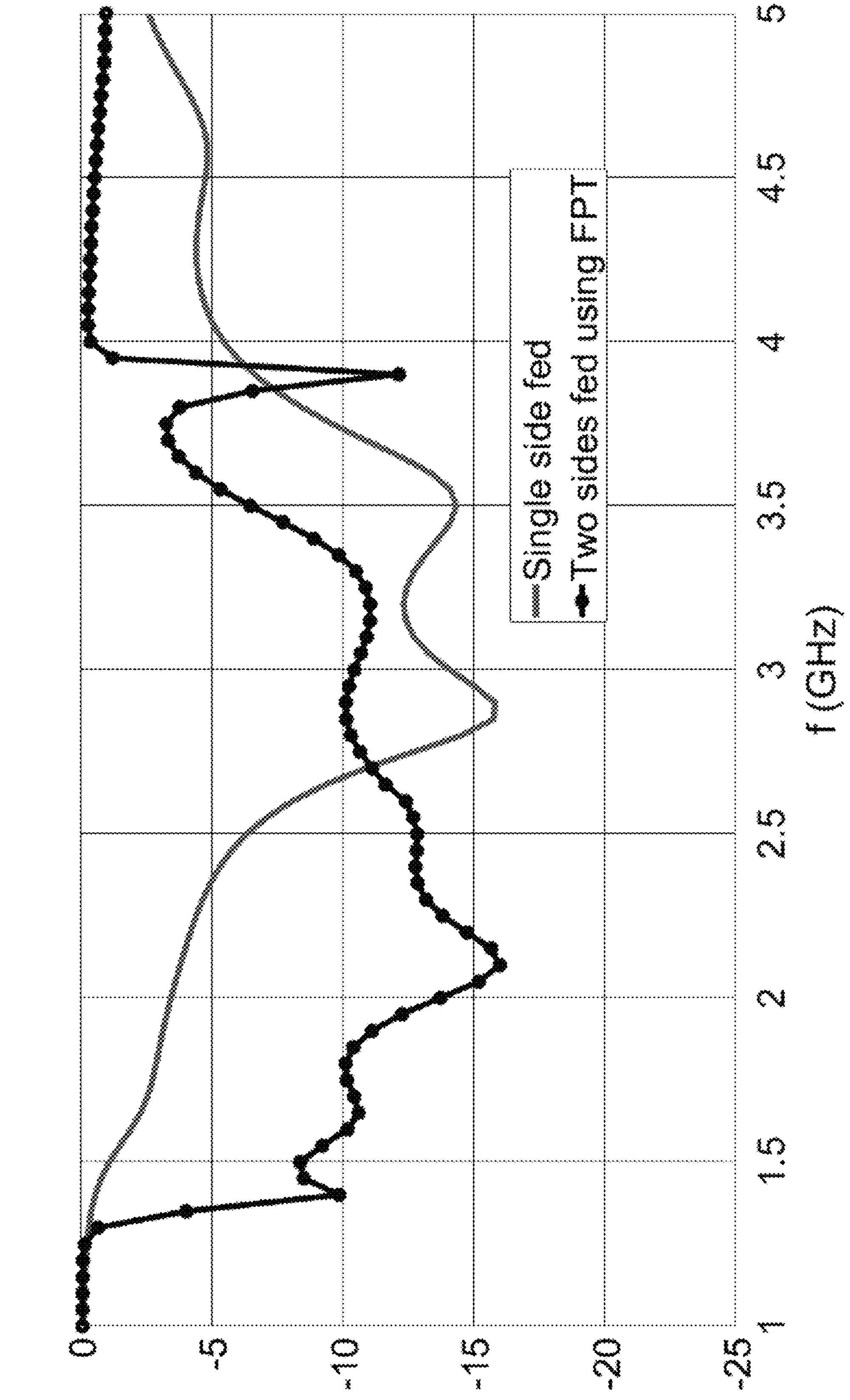
FIG. 10 shows a plot of $S_{11}$ (in dB) versus frequency (in GHz), showing the frequency bandwidth of a BETTSA. The curve with the highest $S_{11}$ value at a frequency of 5 GHz is for the case of two sides fed using the FP technique; and the curve with the lowest $S_{11}$ value at a frequency of 5 GHz is for the case of single side fed.
Figure 11:
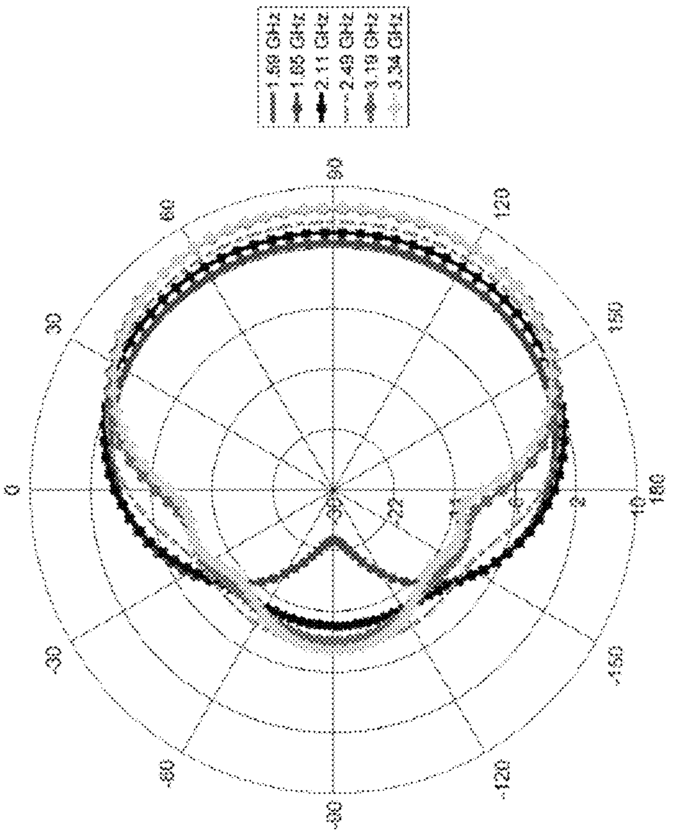
FIG. 11 shows radiation patterns (elevation angle) for the BETTSA shown in FIGS. 7-9, for single side fed and both side fed.
Figure 11:
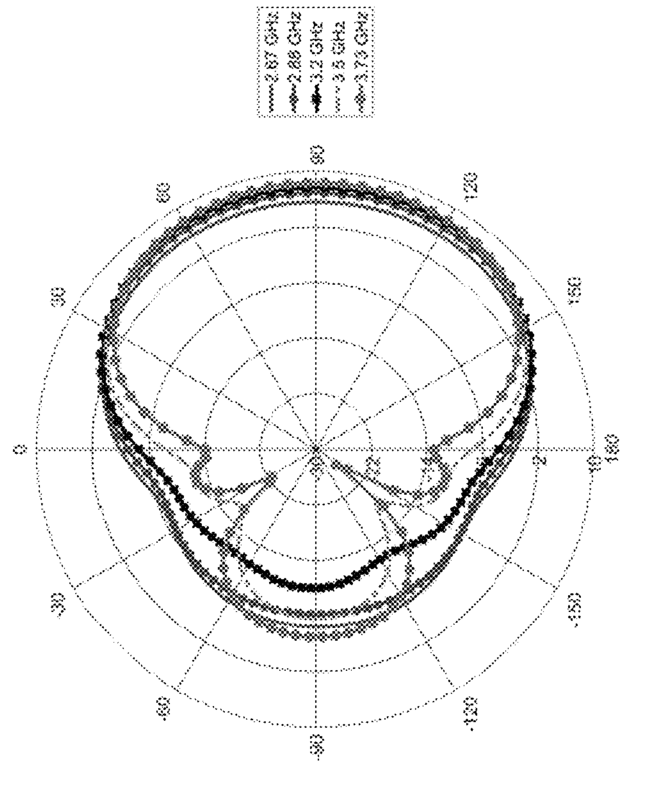
Figure 12:
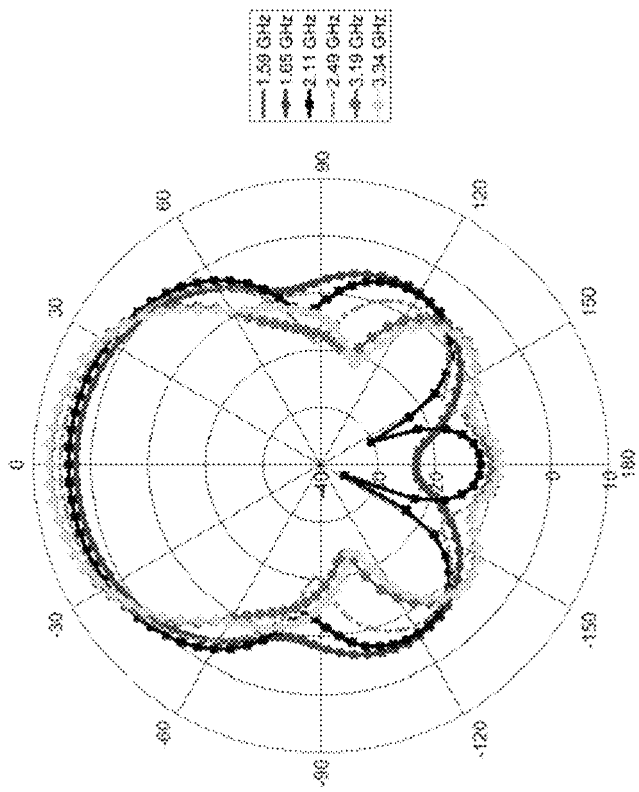
FIG. 12 shows radiation patterns (azimuth angle) for the BETTSA shown in FIGS. 7-9, for single side fed and both side fed.
Figure 12:
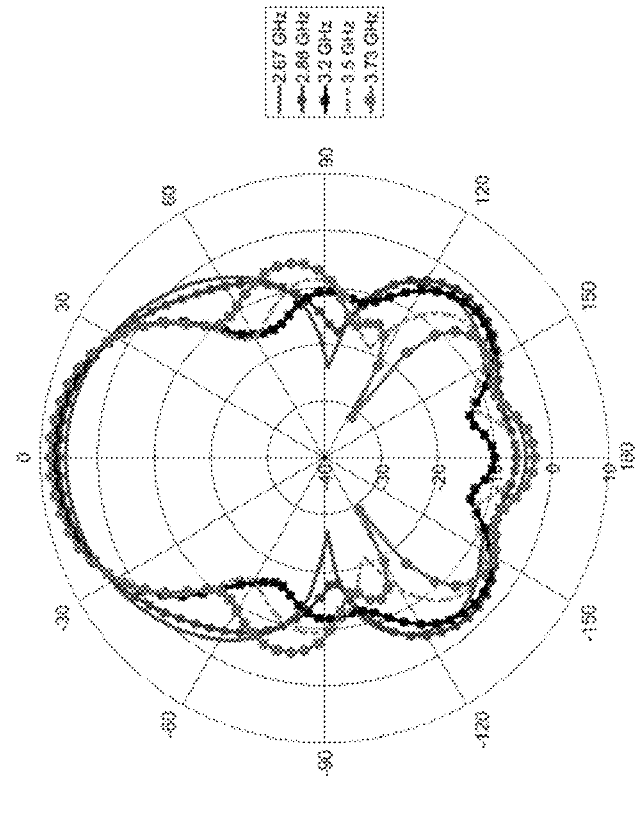

Referring to FIG. 10, the fractional bandwidth of the designed/tested BETTSA was 75.94% (for $S_{11}$<−10 dB), which is approximately equivalent to VSWR<2. The fractional bandwidth of the traditional design (i.e., triangular tapered slot antenna fed only at one of its sides) is 33.21%. Thus, the designed/tested BETTSA showed a 128% increase compared to the traditional design. Also, referring to FIGS. 11 and 12, the designed/tested BETTSA exhibited consistent radiation performance across the entire increased bandwidth (i.e., its radiation characteristics remained the same across the entire increased bandwidth). The radiation patterns of the BETTSA at various example frequencies shown in FIGS. 11 and 12 (here, the edge and best matched frequencies throughout the antenna's bandwidth) confirm that the radiation characteristics were retained after the bandwidth enhancement.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. An antenna, comprising:

an antenna ground plane comprising an antenna element, the antenna element being fed at a first feeding point from N different sides, where N is an integer greater than 1; and an unequal 1:N power divider connected to the antenna ground plane as a feeding network to excite the first feeding point, the antenna having a bandwidth that is larger than a bandwidth of a single-side-fed antenna with a same footprint as the antenna.

2. The antenna according to claim 1, the bandwidth of the antenna being at least 75% larger than the bandwidth of the single-side-fed antenna.

3. The antenna according to claim 1, the N different sides being connected to each other by a coupled connection.

4. The antenna according to claim 1, where N is 2.

5. The antenna according to claim 1, the antenna element being a patch antenna element.

6. The antenna according to claim 1, the antenna element being a slot antenna element.

7. The antenna according to claim 1, the antenna element being a printed dipole antenna element.

8. The antenna according to claim 1, each side of the N sides exciting a same mode of operation of the antenna.

9. The antenna according to claim 1, each side of the N sides exciting a mode of operation at its own respective impedance.

10. The antenna according to claim 1, the respective impedance of the mode of operation of each side of the N sides being different from that of each other side of the N sides.

11. The antenna according to claim 1, the antenna being configured to exhibit consistent radiation performance across an entire operational bandwidth of the antenna.

12. The antenna according to claim 1, the power divider being a multilayer power divider.

13. An antenna, comprising:

an antenna ground plane comprising an antenna element, the antenna element being fed at a first feeding point from N different sides, where N is an integer greater than 1;

an unusual 1:N power divider connected to the antenna ground plane as a feeding network to excite the first feeding point;

a power divider bottom part of the power divider;

a bottom substrate disposed on the power divider bottom part, the antenna ground plane being disposed on the bottom substrate;

a top substrate disposed on the antenna ground plane; and a power divider top part of the power divider disposed on the top substrate.

14. The antenna according to claim 13, the bottom substrate being in direct physical contact with the power divider bottom part, the antenna ground plane being in direct physical contact with the bottom substrate, the top substrate being in direct physical contact with the antenna ground plane, and the power divider top part being in direct physical contact with the top substrate.

15. The antenna according to claim 13, further comprising a power divider via connecting the power divider bottom part to the power divider top part at a first location and going through the bottom substrate, the antenna ground plane, and the top substrate, the first location being spaced apart from the first feeding point.

16. The antenna according to claim 13, further comprising:

a first feed via disposed at the first feeding point and connecting the power divider bottom part to the antenna ground plane; and a second feed via disposed above the first feed via and connecting the antenna ground plane to the power divider top part.

17. The antenna element according to claim 13, a thickness of the bottom substrate being equal to a thickness of the top substrate.

18. An antenna, comprising:

an antenna ground plane comprising an antenna element, the antenna element being fed at a first feeding point from N different sides, where N is an integer greater than 1;

an unequal 1:N power divider connected to the antenna ground plane as a feeding network to excite the fist feeding point;

a power divider bottom part of the power divider;

a bottom substrate disposed on the power divider bottom part, the antenna ground plane being disposed on the bottom substrate;

a top substrate disposed on the antenna ground plane;

a power divider top part of the power divider disposed on the top substrate; and a power divider via connecting the power divider bottom part to the power divider top part at a first location and going through the bottom substrate, the antenna ground plane, and the top substrate, the first location being spaced apart from the first feeding point, the bottom substrate being in direct physical contact with the power divider bottom part, the antenna ground plane being in direct physical contact with the bottom substrate, the top substrate being in direct physical contact with the antenna ground plane, the power divider top part being in direct physical contact with the top substrate, the antenna having a bandwidth that is at least 75% larger than a bandwidth of a single-side-fed antenna with a same footprint as the antenna, each side of the N sides exciting a same mode of operation of the antenna at its own respective impedance, and the antenna being configured to exhibit consistent radiation performance across an entire operational bandwidth of the antenna.

19. The antenna according to claim 18, where N is 2.

* * * * *